United States Patent Office 3,803,226
Patented Apr. 9, 1974

3,803,226
PROCESS FOR PREPARING ALKYL OR ARYL PHOSPHONOTHIOIC DIHALIDES
Eugene H. Uhing, Ridgewood, N.J., and Arthur D. F. Toy, Stamford, Conn., assignors to Stauffer Chemical Company, New York, N.Y.
No Drawing. Filed Feb. 2, 1972, Ser. No. 223,007
Int. Cl. C07f 9/42
U.S. Cl. 260—543 P                  11 Claims

ABSTRACT OF THE DISCLOSURE

Alkyl or aryl phosphonothioic dihalides are prepared by reacting an alkyl halide or aryl halide respectively with a tri-valent phosphorus compound having three halogens attached thereto, i.e., phosphorus trihalide or with a pentavalent thiophosphorus halide having three halogens attached in the presence of $P_4S_{10}$ and elemental phosphorus under at least autogenous pressure at a temperature of from 200° C. to 450° C. The compounds obtained are useful as constituents in insecticides, fungicides, pharmaceuticals, and as intermediates in preparation of other organo-phosphorus compounds.

The present invention relates to a new and improved process for the preparation of alkyl or aryl phosphorothioic dihalides.

BACKGROUND OF THE INVENTION

Alkyl phosphonic dihalides have been prepared in the prior art by reacting alkyl halides with phosphorus trihalides in the presence of aluminum chloride. The reaction proceeds at room temperature according to the formula set forth in Heuben-Weyl, Methoden der Organis Chenchemie at volume 12, part 1 (1965) at page 396.

(I)

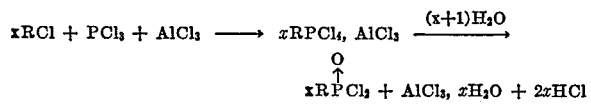

The Heuben-Weyl reference also notes that the reaction has been attempted in the absence of the aluminum chloride catalyst with little success. The alkyl phosphonothioic dihalides are prepared by replacing the oxygen of the alkyl phosphonic dihalide with sulfur. The yields of the replacement reaction are limited to the yields obtained in the initial reaction forming the alkyl phosphonic dihalide.

Phosphorus pentasulfide is a known reactant in the field of organophosphorus chemistry as evidenced by U.S. Pats. 2,471,472, 2,482,810, 2,495,799, and 2,685,602. It is also known (U.S. Pat. 2,662,917, Example IV) that phenyldichlorophosphine can be reacted at a moderate or relatively low temperature in the presence of an aluminum chloride catalyst with phosphorus trichloride and phosphorus pentasulfide to provide benzenethionophosphonyl dichloride ($C_6H_5P(S)Cl_2$). Removal of the catalyst provides significantly decreased yields. This patent also teaches that benzene can be reacted with phosphorus trichloride in the presence of aluminum chloride and phosphorus pentasulfide at moderate temperatures (40° C.), cf. Ex. VII.

It is also known that alkyl or aryl phosphorus dichlorides can be prepared from an alkyl or aryl halide, phosphorus trichloride and phosphorus at elevated temperatures in an autoclave and autogenous pressure ("Dried Synthesis of Alkyl and Aryl–Phosphorus Dichlorides and Dibromides"—Zhurnol Obshchei Khimii, vol. 37 No. 4, pp. 890–892, April 1967).

All of the foregoing methods have the distinct limitations of low product yield and excessive byproduct formation.

THE INVENTION

In accordance with the present invention there is provided a new method for preparing compounds of the formula:

(II)                 $R—P(S)X_2$ wherein R is a $C_1$ to $C_{20}$ alkyl radical and the aryl (1 and 2 fused rings) substituted derivative thereof, cycloalkyl of 5–6 carbons in the ring, an aryl radical of up to 3 fused rings or biphenyl, and the $C_1$–$C_4$ alkyl substituted derivatives of the cycloalkyl, aryl, or biphenyl groups and X is a halogen of chlorine or bromine. The method comprises reacting an alkyl or aryl halide of the formula:

(III)                 RX with a trivalent phosphorus compound of the formula:

(IV)                 $PX_3$ or a pentavalent thiophosphoryl halide of the formula (V)                  $P(S)X_3$ or mixtures of the trivalent and pentavalent phosphorus halide in the presence of a phosphorus pentasulfide and elemental phosphorus wherein R and X are as defined above. The reaction is conducted at a temperature of from about 200° C. to about 450° C. under at least autogenous pressure. The process of the present invention requires no separate catalyst in order to effect reaction. The preferred reactant is the chloro compound. The preferred system uses phosphorus trichloride and/or thiophosphoryl chloride. Some of the dihalide products are known and have utility as chemical intermediates, particularly in the preparation of insecticides, fungicides, pharmaceuticals, and other organophosphorus compounds. The reaction is of particular importance since there are no significant byproducts formed in contrast to other processes for preparing these compounds which suffer from the disadvantage of significant byproduct formation. Surprsingly, this is true whether the phosphorus trihalide, thiophosphoryl halide or mixtures thereof are used in the reaction.

In the invention, X is a halogen of chlorine or bromine, preferably chlorine. For most intermediate type reactions, chlorine is preferred as it is inexpensive and reacts readily. Bromine, though equivalent to chlorine, is more expensive and can be used with facility if it is desired to have bromine in the final compound and for special purposes, e.g., in the preparation of bromine containing intermediates for flame retardant compounds. Basically, and for practical purposes, chlorine is the preferred entity.

In Formula II, R can be a $C_1$ to $C_{20}$ alkyl group and preferably the $C_1$ to $C_4$ alkyl group. The R group is also intended to include the aryl (1 or 2 fused rings) substituted derivatives of the alkyl groups, i.e., aralkyl, or any other modifications of the alkyl radicals with noninterfering substituents. The alkyl groups are represented by methyl, ethyl, n-propyl, and isopropyl, n-butyl, isobutyl, and tert-butyl, as well as pentyl, hexyl, heptyl, octyl, nonyl, decyl, dodecyl, tetradecyl, hexadecyl, octodecyl, and eicosyl. The aralkyl groups are represented by phenylmethyl, phenylethyl, phenylbutyl, phenyloctyl, phenylhexadecyl, and the corresponding naphthyl derivatives.

R can also be cycloaklyl of 5–6 carbons in the ring and the $C_1$–$C_4$ alkyl substituted derivatives thereof. These ring systems are illustrated by cyclopentyl and cyclohexyl and its derivatives.

R can also be an aryl of up to and including 3 fused rings. These aromatic compounds include the benzene series of ring compounds, the naphthalene series of compounds as well as the anthracene series and preferably those of the benzene series. Included within each series are those compounds wherein the ring hydrogens are substituted with non-interfering groups. Some of these non-interfering groups can be illustrated by the $C_1$ to $C_4$ alkyl derivaitves (alkaryl) which are given only as illustrative of the many equivalent groups which could be used by one skilled in the art. These radicals can be illustrated by phenyl, methylphenyl, i.e. (tolyl), ethylphenyl, propylphenyl, and butylphenyl, naphthyl, methylnaphthyl, ethylnaphthyl, propylnaphthyl, butylnaphthyl, anthryl, methylanthryl, propylanthryl, butylanthryl, as well as dimethylphenyl, dimethylnaphthyl, diethylanthryl, and the like.

Any of these radicals can contain one or more alkyl radicals. Any isomeric form of these radicals can be used.

The R group can also be biphenyl. Also included in the term biphenyl are the $C_1$ to $C_4$ alkyl substituted derivatives such as methylbiphenyl and ditolyl. The substituents can be one or more as desired in any isomeric position desired. The R group can be attached to the phosphorus o, m, or p to the biphenyl linkage, though the ortho position is preferred.

The compounds of the present invention are prepared by reacting a trivalent phosphorus halide, $PX_3$, and/or pentavalent thiophosphoryl halide, $P(S)X_3$, with phosphorus pentasulfide ($P_4S_{10}$) and elemental phosphorus with an alkyl or aryl halide having an attached halogen of the formula:

$$RX \qquad (III)$$

wherein R and X are as defined hereinbefore. Representative compounds within this formula are methyl chloride, propyl chloride, butyl chloride, octyl chloride, decyl chloride, dodecyl chloride, hexadecyl chloride, octadecyl chloride, eicoxyl chloride, and the corresponding bromo-substituted derivatives; chlorocyclopentane, chlorocyclohexane and the corresponding bromo substituted derivatives; chlorobenzene, bromobenzene, chlorotoluene, (chloro) ethylbenzene, (bromo) ethylbenzene, (chloro) propylbenzene, (bromo) propylbenzene, (chloro) butylbenzene, (bromo) butylbenezene, chloronaphthalene, bromonaphthalene, (chloro) methylnaphthalene, (bromo) methylnaphthalene, (chloro) naphthalene, (bromo) ethylnaphthalene, (chloro) propylnaphthalene, (bromo) butylnaphthalene, chloroanthracene, (chloro) methylanthracene, bromoanthracene, (chloro) butylanthracene, chlorodimethylbenzene, bromodimethylnaphthalene, chlorodiethylanthracene, and the like. In the aliphatic series above the $C_2$ alkyl and in the aromatic series, isomeric forms of the same compound are formed. These are intended to be included in the definition of the compound. The foregoing compounds are given as illustrative and are in no way considered to be totally inclusive of all of the alkyl and aryl halides which can be used in the method of the present invention.

The trivalent phosphorus halide used in the present invention can be depicted by the Formula IV:

$$PX_3$$

the radical X is a halogen of chlorine or bromine. The three halogens can and are preferably the same halogen though mixed halogens can be used. For most chemical intermediate purposes, the chlorine derivative is preferred. The bromine species can be prepared if desired.

The pentavalent thiophosphoryl halide used in the present invention can be depicted by the formula:

$$P(S)X_3$$

wherein X is a halogen of chlorine or bromine. The three halogens can and are preferably the same halogen though mixed halogen compounds can be used. For most chemical intermediate purposes, the chlorine derivative is preferred. The bromine species can be used if desired.

Representative pentavalent thiophosphoryl halides are thiophosphoryl chloride, thiophosphoryl bromide, thiophosphoryl chlorodibromide, and thiophosphoryl bromodichloride. For economic reasons, the pentavalent thiophosphoryl halide is preferably thiophosphoryl chloride or thiophosphoryl bromide and more preferably thiophosphoryl chloride. Mixtures of the pentavalent thiophosphoryl halide can be used without departing from the scope of the invention.

The reaction of the alkyl or aryl halide and the trivalent phosphorus halide and/or the thiophosphoryl halide is conducted in the presence of a phosphorus pentasulfide, $P_4S_{10}$ and elemental phosphorus. Phosphorus pentasulfide is well known to the prior art and generally depicted by the formula ($P_2S_5$). The formula ($P_2S_5$) is the lowest numerical formula designation and has been adopted by the old prior art though later experiments show the actual compound to have a molecular formula of $P_4S_{10}$. The two formulas are considered equivalent for the purposes of this specification. The elemental phosphorus can be used in any of its common elemental forms. Preferably yellow (or white) phosphorus is used.

Stoichiometrically, the present reaction appears to require a ratio of 3 moles of the alkyl or aryl halide per mole of the trivalent phosphorus halide and/or pentavalent thiophosphoryl halide in addition to $P_4S_{10}$ and phosphorus (as P) used to prepare monophosphonothioic compounds. As the amount of thiophosphoryl halide increases, the amount of $P_4S_{10}$ required decreases and the amount of phosphorus required increases. A theoretical reaction scheme can be postulated as follows:

(VI)

$$3RX + aPX_3 + bP(S)X_4 + (0.3a + 0.2b)P_4S_{10} + (0.8a + 1.2b)P \rightarrow 3RP(S)X_2$$

wherein R and X are as defined hereinbefore and $a$ plus $b$ equals one. The mechanism of the reaction is not completely understood. This is only a postulated reaction mechanism and applicants do not intend to limit their process thereto.

Applicants also do not intend to be limited to the amounts or ratio of reactants specified in connection with the theoretical reaction mechanism. In actuality, the mole ratio of alkyl or aryl halide to trivalent phosphorus halide and/or the pentavalent thiophosphoryl halide can vary between 6 to 1 and 2.5 to 1 with excess reactant being recovered. Similarly, the amount of phosphorus pentasulfide can vary between 0.4 and 0.2 moles per mole of trivalent phosphorus compound and/or the pentavalent thiophosphoryl halide. The amount of elemental phosphorus utilized can also similarly vary between 2 gram atoms to 0.8 gram atoms per mole of trivalent phosphorus compound and/or the pentavalent thiophosphoryl halide. The amount of reactants used can be expressed by the relationship:

$$2.5\text{–}6\ RX + aPX_3 + bP(S)X_3 + 0.2\text{–}0.4P_4S_{10} + 0.8\text{–}2P$$

wherein $a$ and $b$ are as defined hereinbefore. It is to be understood that these molar or gram atom values are based on one molar quantity of either the phosphorus trihalide or thiophosphoryl halide or a mixture of the two wherein the additive total of the molar amounts of the two equals one. The amounts given in the theoretical mechanism or those closely approaching that amount should be used for efficiency and to avoid by-product formation as well as the necessity of extensive product purification and excess reactant recovery.

It is also to be understood that the method of the present invention can proceed with either the trivalent phosphorus halide or the thiophosphoryl halide alone or mixtures thereof. Any stoichiometric amounts of these reactants can be used though it is preferred that the additive molar total of these reactants equals about one as set forth hereinbefore so as to avoid the necessity of separating unreacted starting material.

The process of the present invention is carried out at elevated temperature and at least at autogenous pressure. Temperatures of between about 200° C. and 450° C. and preferably from about 200° C. to 390° C. are generally employed. The method of the present invention may conveniently be effected by introducing the individual reactants into a reaction zone capable of withstanding elevated pressure, such as a metal bomb, autoclave, or other pressure vessel, and carrying out the reaction under at least autogenous pressure developed by the reactants at the reaction temperature. Pressures of up to 200 atmospheres above the autogenous pressure can also be used but are less desirable due to the inconvenience of requiring a stronger pressure vessel. The time of reaction after the reaction vessel has reached reaction temperature may vary over relatively wide limits such as between about five minutes up to about twenty hours, but the preferable reaction time has been found to be between about ten minutes and fifteen hours. Heat up time is generally accomplished in one to two hours.

In general, the reaction equipment is required to be a pressure vessel. The vessel should be equipped with an agitation mechanism (a rocker, vibrator, or stirrer) for the best results. The reaction with the phosphorus pentasulfide proceeds easily due to the fact that the melting point of the pentasulfide is about the same as the reaction temperature and the phosphorus pentasulfide is soluble in the reaction mixture. The phosphorus pentsulfide can also be supported on a plug of glass wool or porcelain to decrease any caking tendency if prevalent. The reaction may be carried out in continuous or batchwise systems as desired.

The products of the reaction are purified by conventional methods such as by fractional distillation of liquids and crystallization or extraction of solid products. The identification of products is achieved by conventional methods, such as elemental analysis, and gas chromatography for purity and mass spectrometer and nuclear magnetic resonance and infrared analysis to establish structure.

In some cases, it has been found desirable, and possibly essential to conduct the present reaction in the presence of diluents if high yields are desired. In certain instances, the diluent is actually a reactant and becomes part of the product. When an aryl monohalide is reacted with a trivalent phosphorus halide $PX_3$ and $P_4S_{10}$, there is some tendency to replace the halogen of the trivalent phosphorus halide with the aryl compound without removing the halogen from the aryl ring.

This side reaction can be significantly reduced by conducting the reaction in a diluent of the group of benzene which is the parent hydrocarbon from which the aryl halide (RX) reactant is derived. Benzene is preferred in the reaction with chlorobenzene. Aliphatic hydrocarbons could be used with alkyl chloride. Other diluents such as chlorotoluene could be used but these would provide mixtures of various products. The use of a different diluent might be desirable in the preparation of multiple function mixtures, particularly in the hydraulic fluid field. At least 0.1 to about 10 moles of the diluent per mole of RX reactant is required to be present though best results are obtained using about an equimolar amount.

Illustrative of the compounds which can be prepared by the method of the present invention are:

Alkyl:
$CH_3P(S)Cl_2$
$CH_3P(S)Br_2$
$C_2H_5P(S)Cl_2$
$C_2H_5P(S)Br_2$
$C_3H_4P(S)Cl_2$
$C_4H_9P(S)Cl_2$
$C_4H_9P(S)Br_2$
$C_5H_{11}P(S)Cl_2$
$C_8H_{17}P(S)Cl_2$
$C_8H_{17}P(S)Br_2$
$C_{18}H_{37}P(S)Cl_2$
$(CH)_3CCH_2P(S)Cl_2$
$CH_3(CH_2)_4(CH)(C_2H_5)CH_2P(S)Cl_2$

CYCLIC COMPOUNDS

Aromatic series

Benzene series:

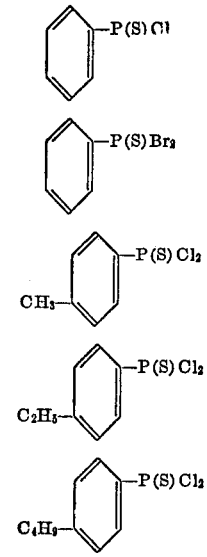

Naphthalene series:

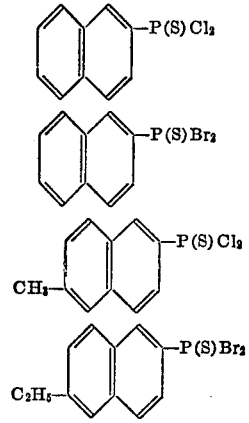

Anthracene series:

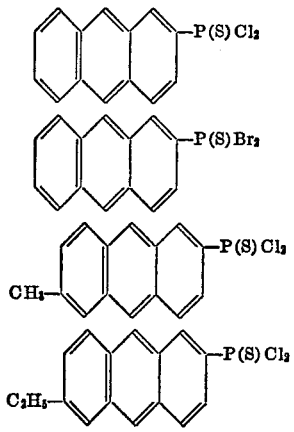

Biphenyl series:

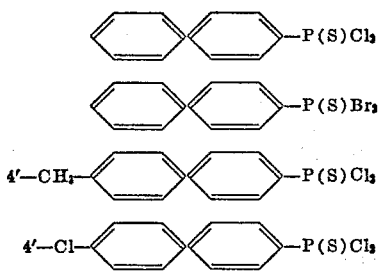

Aliphatic series:
5 membered carbon ring:

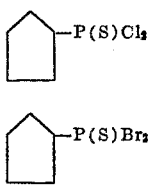

6 membered carbon ring:

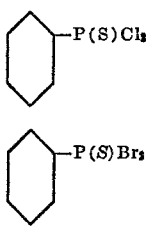

The products of the present invention are dihalides of pentavalent phosphorus and, therefore, can be subject to all the known reactions which such compounds undergo. The compounds of the invention can be used to make insecticides as illustrated by the process for making O-ethyl O-para-nitrophenyl phenylphosphonothioate as per the following illustrative reaction scheme:

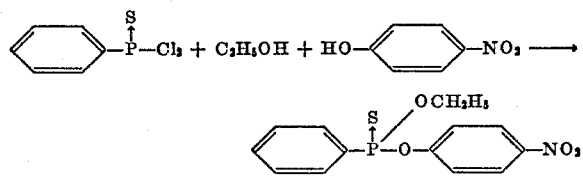

and for making O-ethyl S-phenyl ethylphosphonothioate as per the following illustrative reaction scheme:

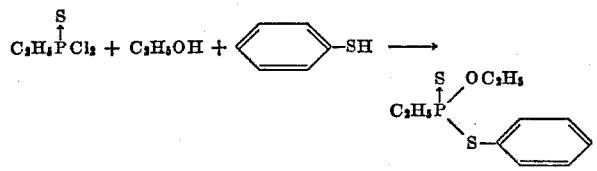

The present invention will be more fully illustrated in the examples which follow.

Example 1.—Preparation of methylphosphonothioic dichloride

In a 30 milliliter Pyrex Carius tube were placed 5.5 grams of $PCl_3$ (0.04 mole), 5.3 grams of $P_4S_{10}$ (0.012 mole), 1.0 grams of yellow phosphorus (0.0324 gram atoms), and 6.7 grams of $CH_3Cl$ (0.134 mole). The Pyrex Carius tube was cooled to $-190°$ C. in a liquid nitrogen bath, placed under 10 millimeters mercury pressure and sealed. The sealed tube was placed in a 300 milliliter autoclave (having a 5000 p.s.i. rupture disc) containing 50 milliliters of hexane to equalize the pressure outside of the sealed Pyrex Carius tube. The autoclave was heated to $200°$ C. for 2 hours and at $300°$ C. for 17 hours. The auotclave was allowed to cool to room temperature and then cooled to $-70°$ C. so that the sealed Pyrex Carius tube could be safely removed. The Carius tube was broken open and the contents allowed to warm to room temperature. The crude yield of yellow liquid was 17.4 grams or 94% of the starting weight. The crude product was assayed by gas/liquid chromatography using an internal standard and was found to be 78% methylphosphonothioic dichloride. There also were present 0.8 gram by-product $P(S)Cl_3$. The yield based on phosphorus reacted is 80%.

Example 2.—Preparation of ethylphosphonothioic dichloride

The same procedure described in Example 1 was repeated using 7.7 grams of ethyl chloride (0.12 mole), 5.5 grams of $PCl_3$ (0.04 mole), 5.2 grams of $P_4S_{10}$ (0.012 mole) and 1.0 gram of yellow phosphorus (0.032 gram atoms). The reaction was heated to $305°$ C. for 17 hours. After cooling, the Carius tube was broken and the weight of the contents decreased by 2 grams due to gassing. The crude weight was 15.7 grams. The material was assayed by gas-liquid chromatography (GLC) with internal standard added. The GLC analysis showed 0.4 gram of $PCl_3$, 0.25 gram of $P(S)Cl_3$, and 8.65 grams of $C_2H_5P(S)Cl_2$ (0.053 mole). This represents a 44% theoretical yield of $C_2H_5P(S)Cl_2$. The crude sample was distilled to give 7.5 grams $C_2H_5P(S)Cl_2$ having the following analysis: 18.9% P; 43.5% Cl as compared to 19.0% P; 43.6% Cl theoretical. The nuclear magnetic resonance spectra confirms the product to be $C_2H_5P(S)Cl_2$.

Example 3.—Preparation of ethylphosphonothioic dichloride

The following reaction was run in a 300 milliliter 316 stainless steel autoclave with a 5000 p.s.i. rupture disc. The autoclave was charged with 55 grams of $PCl_3$ (0.4 mole) 25 grams of $P_4S_{10}$ (0.0565 mole), 4.7 grams of yellow phosphorus (0.15 gram atoms), and 39 grams of ethyl chloride (0.6 mole). The autoclave was heated with rocking for agitation at $275°$ C. for 18 hours. After cooling a thick dark liquid was poured from the autoclave. The distilled yield of ethylphosphonothioic dichloride was 30 grams or 31% of the theoretical amount. The lower yield compared to that in Example 2 is due to the lower reaction temperature.

Example 4.—Preparation of ethylphosphonothioic dichloride

Using the procedure of Example 3, there were placed in the autoclave 34.0 grams of $P(S)Cl_3$ (0.2 mole), 17.7 grams of $P_4S_{10}$.4 mole), 7.4 grams of yellow phosphorus (0.24 gram atoms), and 38.8 grams of ethyl chloride (0.6 mole). The autoclave was heated at $305°$ C. for 20 hours (1 hour heat up time). After cooling, the contents of the autoclave were placed in a distillation flask. The distilled product, $C_2H_5P(S)Cl_2$, weighed 50.5 grams. The nuclear magnetic resonance spectra was identical to the spectra of an authentic sample of ethylphosphonothioic dichloride $(C_2H_5P(S)Cl_2)$.

*Analysis.*—Calculated for $C_2H_5P(S)Cl_2$. Theoretical (percent): Cl, 43.6; P, 19.0; S, 19.6. Found (percent): Cl, 42.8; P, 18.5; S, 19.8.

Example 5.—Preparation of ethylphosphonothioic dichloride

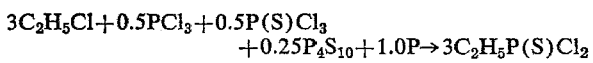

Using the procedure of Example 3, there were placed in an autoclave 16.9 grams of $P(S)Cl_3$ (0.1 mole), 13.7 grams of $PCl_3$ (0.1 mole), 22.2 grams of $P_4S_{10}$ (0.05 mole) 6.2 grams yellow phosphorus (0.2 gram atoms) and 38.8 grams ethyl chloride (0.6 mole). The autoclave was heated at $305°$ C. for 20 hours (1 hour heat up time). After cooling, the contents of the autoclave were placed in a distillation flask. The distilled product $$C_2H_5P(S)Cl_2$$

weighed 51.0 grams. The nuclear magnetic resonance spectra was identical to the spectra of an authentic sample of ethylphosphonothioic dichloride $$(C_2H_5P(S)Cl_2)$$

*Analysis.*—Calculated for $C_2H_5P(S)Cl_2$. Theoretical (percent): Cl, 43.6; P, 19.0; S, 19.6. Found (percent): Cl, 42.7; P, 18.6; S, 19.6.

Example 6.—Preparation of phenylphosphonothioic dichloride

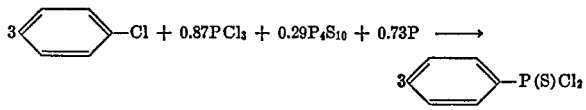

Using the procedure of Example 3, there were placed in the autoclave 38.2 grams of $PCl_3$ (0.278 mole), 40 grams of $P_4S_{10}$ (0.90 mole), 7.3 grams of yellow phosphorus (0.236 gram atoms), and 104.8 grams of chlorobenzene (0.93 mole). The autoclave was heated at 300° C. for 18 hours (1 hour heat-up time). After cooling, 181.6 grams of liquid were recovered from the autoclave. Gas/liquid phase chromatographic analysis with a $C_{18}H_{38}$ internal standard identified the following components of the liquid:

| | |
|---|---|
| 73.8 grams | $\langle \bigcirc \rangle\!-\!P(S)Cl_2$ |
| 27.4 grams | $PCl_3$ |
| 3.4 grams | $P(S)Cl_3$ |
| 3.4 grams | $\langle \bigcirc \rangle\!-\!Cl$ |
| 72.1 grams | high boiling materials |
| 180.1 grams | |

This indicates a 38% yield of benzene phenylphosphonothioic dichloride based on charged chlorobenzene. The recovery of 3.4 grams of chlorobenzene indicates a 97% conversion of the chlorobenzene into some product form. Based on recovered $PCl_3$, 28% of the $PCl_3$ was converted into product.

The product was purified by distillation by taking 165 grams and distilling under various temperature/pressure conditions as follows:

| Fraction | Temp./pressure | Weight, grams |
|---|---|---|
| 1 | 60–92° C./1 atom | 12.4 |
| 2 | 60–90° C./1.2 mm. Hg | 12.2 |
| 3 | 90–118° C./1.5 mm. Hg | 65.2 |
| 4 | 118–190° C./1.5 mm. Hg | 19.4 |
| 5 | 190–197° C./1.5 mm. Hg | 15.4 |
| Residue | | 38.0 |
| Trap | | 1.0 |
| Total | | 163.6 |

Total recovery of benzene phenylphosphonothioic dichloride was 76.3 grams based on the 165 gram charge.

All other compounds within the scope of the invention can be easily prepared by using the foregoing procedures and the corresponding reactants, some of which have been specifically listed hereinbefore, and the remainder being within the grasp of those skilled in the art.

The present invention is defined in the claims which follow.

What is claimed is:

1. A method for preparing compounds of the formula:

$$R\!-\!P(S)X_2$$

wherein R is a $C_1$ to $C_{20}$ alkyl radical and the aryl substituted derivatives of 1 or 2 fused rings thereof, cycloalkyl of 5–6 carbons in the ring, an aryl radical of up to 3 fused rings, and the $C_1$–$C_4$ alkyl substituted derivatives of the cycloalkyl, aryl, or biphenyl radicals, and X is a halogen of chlorine or bromine, comprising reacting, under at least an autogenous pressure at a temperature of from about 200° C. to about 450° C. and in the presence of phosphorus pentasulfide and elemental phosphorus an alkyl or aryl halide of the formula:

$$RX$$

wherein R and X are as defined above with a member selected from the group of a trivalent phosphorus trihalide of the formula:

$$PX_3$$

a pentavalent thiophosphoryl halide of the formula:

$$P(S)X_3$$

or mixtures thereof, wherein X is as defined above.

2. The method as recited in claim 1 wherein X is chlorine.

3. The method as recited in claim 1 wherein R is a $C_1$ to $C_4$ alkyl.

4. The method as recited in claim 1 wherein R is methyl.

5. The method as recited in claim 1 wherein said reaction is conducted at a temperature of from about 200° C. to about 390° C.

6. The method as recited in claim 1 wherein said halide is methyl chloride.

7. The method as recited in claim 1 wherein the trivalent phosphorus compound is phosphorus trichloride.

8. The method as recited in claim 1 wherein said thiophosphoryl halide is thiophosphoryl chloride.

9. The method as recited in claim 1 wherein said halide is ethyl chloride.

10. The method as recited in claim 1 wherein the ratios of reactants are within the approximate ranges defined in the relationship:

$$2.5\text{–}6RX + aPX_3 + bP(S)X_3 + 0.2\text{–}0.4P_4S_{10} + 0.8\text{–}2P$$

wherein $a$ and $b$ are any numbers between 0 and 1 inclusive and the additive total of $a+b$ is one.

11. The method as recited in claim 1 wherein the ratio of reactants is defined approximately by the relationship:

$$3RX + aPX_3 + bP(S)X_3 + (3.0a + 0.2b)P_4S_{10} + (0.8 + a \cdot 2b)P$$

wherein $a$ and $b$ are any numbers between 0 and 1 inclusive and the additive total of $(a+b)$ is one.

References Cited

Ulrich Schmidt et al.: Angew. Chem. Internat. Edit., vol. 9 (1970), No. 6, p. 458.

LORRAINE A. WEINBERGER, Primary Examiner

R. D. KELLY, Assistant Examiner

PO-1050
(5/69)

UNITED STATES PATENT OFFICE
CERTIFICATE OF CORRECTION

Patent No. 3,803,226                Dated April 9, 1974

Inventor(s) Eugene H. Uhing and Arthur D. F. Toy

It is certified that error appears in the above-identified patent and that said Letters Patent are hereby corrected as shown below:

Column 10, line 55, Claim 11, "+a.2b" should be -- +1.2b --.

Signed and sealed this 17th day of September 1974.

(SEAL)
Attest:

McCOY M. GIBSON JR.                C. MARSHALL DANN
Attesting Officer                  Commissioner of Patents